(12) United States Patent
Claudel et al.

(10) Patent No.: US 6,289,977 B1
(45) Date of Patent: Sep. 18, 2001

(54) HEAT EXCHANGER, AND HEAT EXCHANGING BEAM, AND RELATED WELDING METHODS AND PRODUCTION

(75) Inventors: Michel Claudel, Sarrebourg; Jean-Claude Fauconnier, Paris; Roland Guidat, Nancy, all of (FR)

(73) Assignee: Ziepack, Courbevoie (FR)

( * ) Notice: Subject to any disclaimer, the term of this patent is extended or adjusted under 35 U.S.C. 154(b) by 0 days.

(21) Appl. No.: 09/269,817

(22) PCT Filed: Oct. 10, 1997

(86) PCT No.: PCT/FR97/01803

§ 371 Date: Apr. 1, 1999

§ 102(e) Date: Apr. 1, 1999

(87) PCT Pub. No.: WO98/16786

PCT Pub. Date: Apr. 23, 1998

(30) Foreign Application Priority Data

Nov. 10, 1996 (FR) .................................................. 96 12468

(51) Int. Cl.[7] ...................................................... F28D 7/10
(52) U.S. Cl. ......................... 165/157; 165/166; 165/162; 165/170; 29/890.042
(58) Field of Search ..................... 165/157, 162, 165/166, 167, 170; 29/890.042

(56) References Cited

U.S. PATENT DOCUMENTS

| | | | |
|---|---|---|---|
| 2,877,000 | * 3/1959 | Person | 165/166 |
| 4,021,901 | * 5/1977 | Kleine et al. | 165/170 |
| 4,029,146 | 6/1977 | Hart et al. | 165/166 |
| 4,219,079 | * 8/1980 | Peze | 165/157 |
| 4,527,547 | * 7/1985 | Suzuki | 165/170 |
| 4,665,975 | 5/1987 | Johnston | 165/167 |
| 4,805,695 | * 2/1989 | Ishikawa et al. | 165/166 |
| 5,070,607 | * 12/1991 | Boardman et al. | 165/170 |
| 5,086,837 | * 2/1992 | Hagemeister | 165/170 |
| 5,234,150 | * 8/1993 | Yamamoto et al. | 228/158 |
| 5,465,785 | * 11/1995 | Adderley et al. | 165/166 |
| 5,494,100 | * 2/1996 | Peze | 165/157 |

FOREIGN PATENT DOCUMENTS

| | | |
|---|---|---|
| 0 186 592 B1 | 10/1988 | (EP) . |
| 0 460 872 A1 | 12/1991 | (EP) . |
| 0 472 850 A2 | 3/1992 | (EP) . |
| 2 680 566 | 2/1993 | (FR) . |
| 58/128236 | 7/1983 | (JP) . |
| 93/13377 | 7/1993 | (WO) . |

* cited by examiner

Primary Examiner—Allen Flanigan
(74) Attorney, Agent, or Firm—Greer, Burns & Crain, Ltd.

(57) ABSTRACT

The module is formed from two sheets welded to each other by laser welding. Longitudinal weld beads define between them longitudinal ducts for the flow of a first fluid. The sheets are also joined together by a peripheral weld bead.

The weld bead defines, beyond the longitudinal ducts, a transition zone which narrows from the longitudinal ducts up to the gap. Weld spots are previously formed in this zone. Once the welds are completed, the module is formed by the injection of a fluid under pressure through a gap in the weld bead.

Utilization for rendering mutually compatible the variations in width of the module during hydroforming in the end regions and for forming, with the transitions zone, a flow distributer to the various channels during operation.

50 Claims, 3 Drawing Sheets

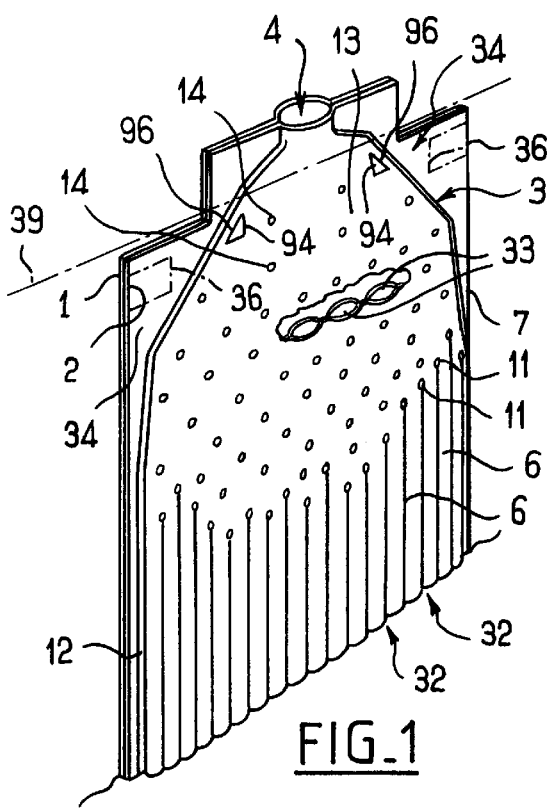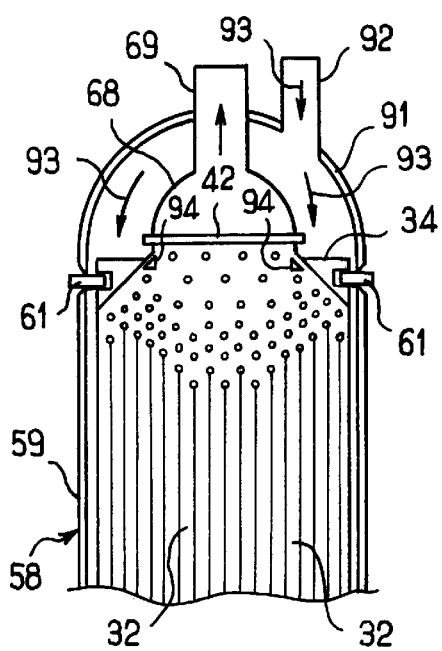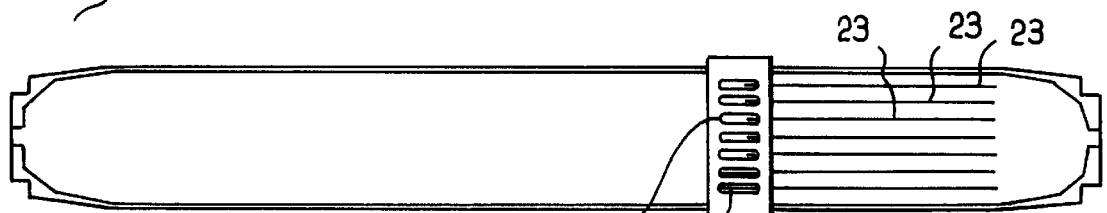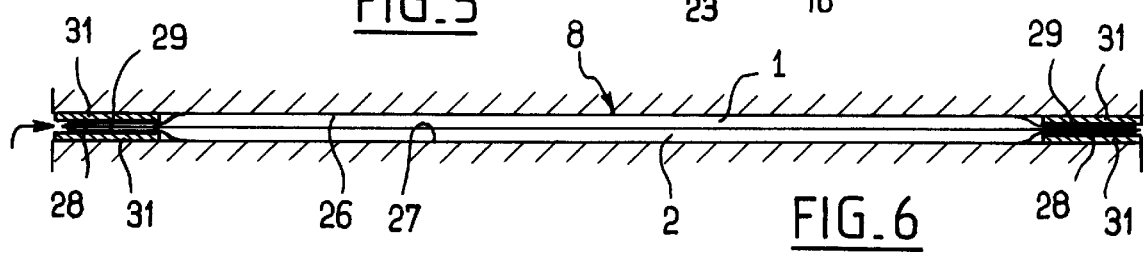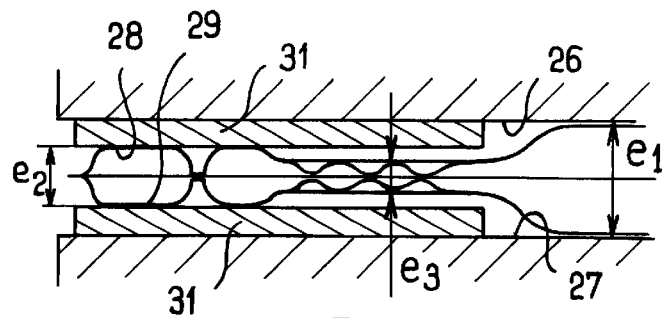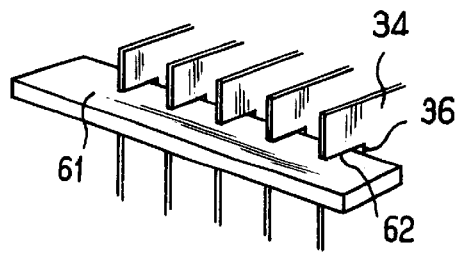

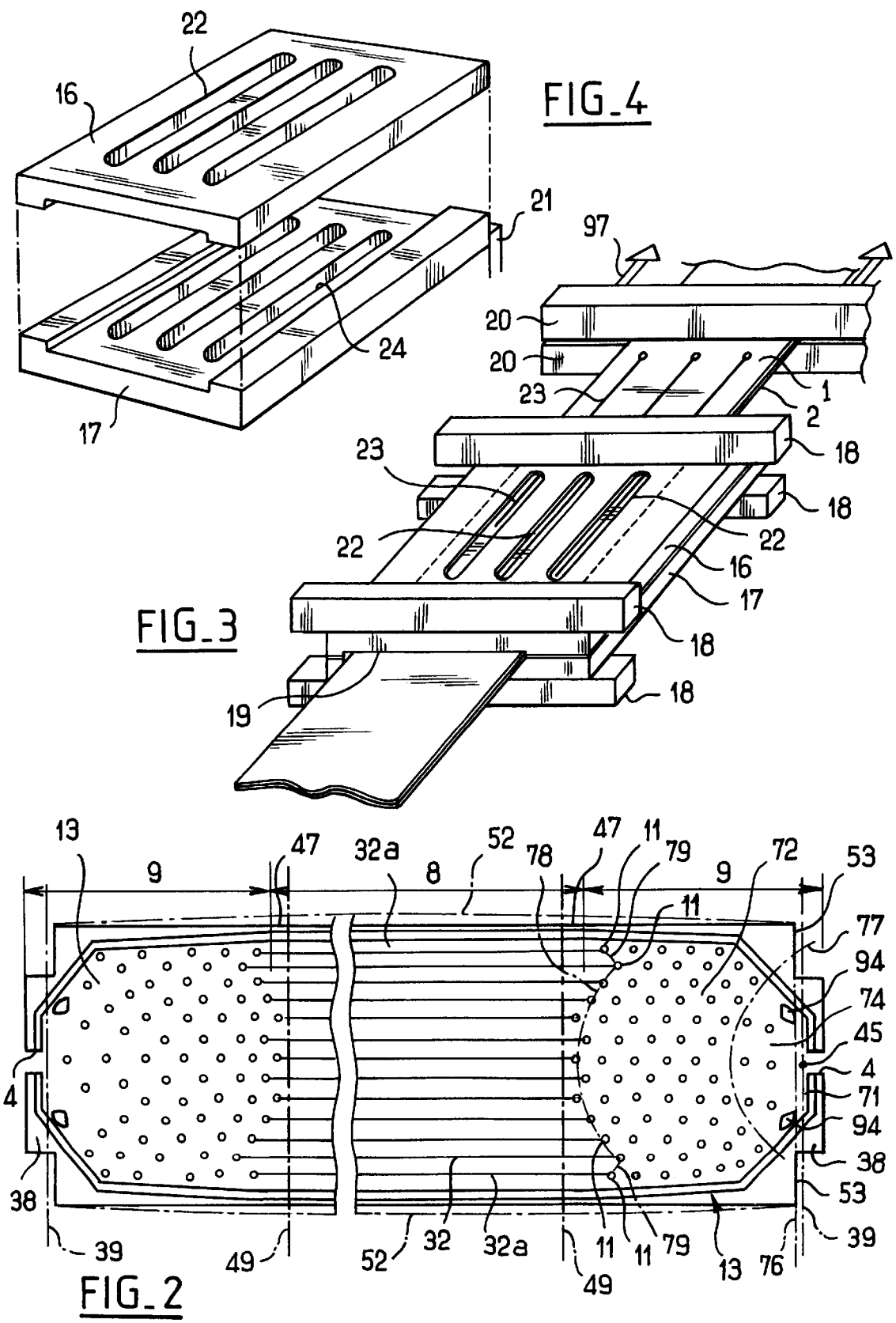

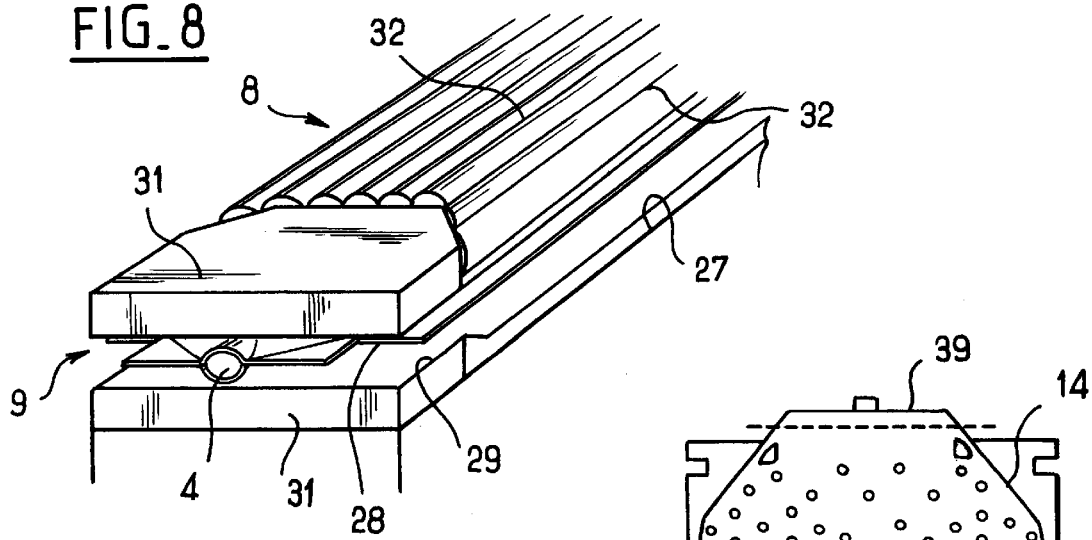
FIG_8
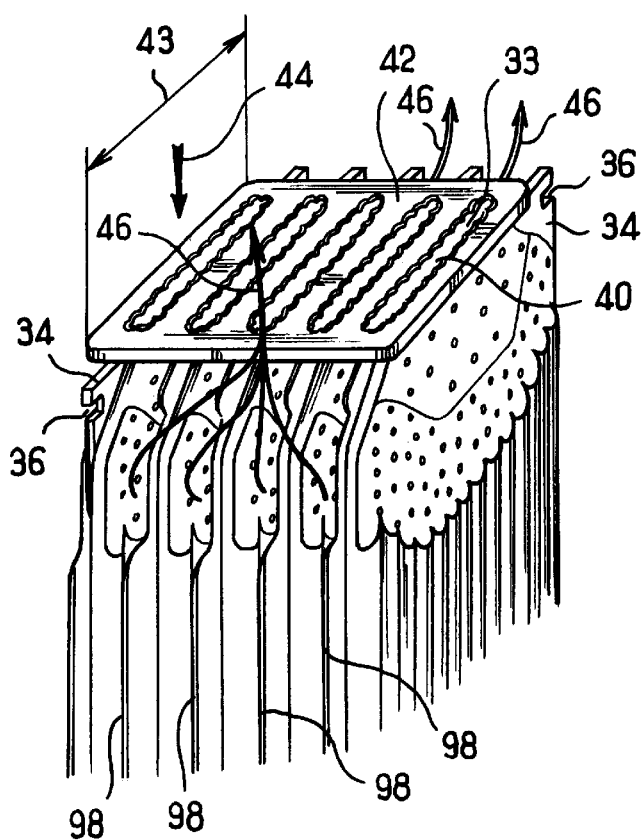
FIG_9
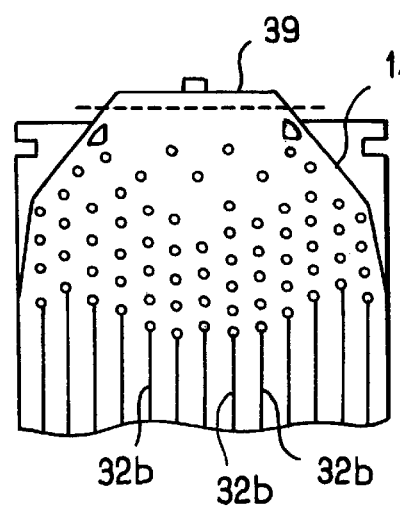
FIG_10
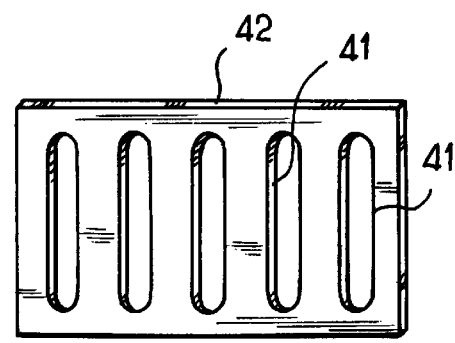
FIG_11

HEAT EXCHANGER, AND HEAT EXCHANGING BEAM, AND RELATED WELDING METHODS AND PRODUCTION

The present invention relates to a heat exchange bundle intended to constitute the thermally active part of a heat exchanger.

The present invention also relates to a method of welding together two sheets by means of weld beads.

The present invention also relates to a method of producing an elementary two-plate module for a heat exchange bundle.

The present invention also relates to a heat exchanger incorporating the heat exchange bundle.

It is possible to make a basic distinction between two categories of industrial exchangers:

tube and trough exchangers, plate exchangers.

Tube and trough exchangers are the most widely used today. They consist of a bundle of parallel tubes in which a first exchange fluid flows, and of means of making the second exchange fluid flow several times in succession across regions of the bundle which are successively closer to the inlet of the first fluid. These exchangers are universally known, and their use in industry for more than a century has demonstrated their reliability. The manufacturing methods are also known, and accessible to innumerable companies throughout the world. They are relatively easy to clean, which allows them to be used with clogging fluids.

On the other hand, they are heavy and bulky, which increases their installation cost.

From the heat exchange point of view, the profile defined by the interior of the tubes is the profile exhibiting the best thermal and hydrodynamic performance. In fact, the exchange coefficient/head loss ratio is better than with any other profile for high flow speeds and fluids having low viscosity (the general case of gasses).

Unfortunately, this remarkable performance is counterbalanced by mediocre efficiency with regard to the fluid flowing outside the tubes. The latter must make numerous changes of direction throughout its passage in the exchanger in order to convert its circuit in the transverse direction with respect to the direction of flow in the tubes into a "pseudo" counter-flow. The said changes of direction result in high head losses without improving the heat exchange, and create dead zones in which the flow of fluid is virtually zero, which greatly diminishes the area effectively used for heat exchange.

Because of this, the thermal and hydraulic performances of tube and trough exchangers are relatively modest in overall terms.

Plate exchangers appeared more recently on the exchanger market (after the second world war). They made an important inroad, particularly in the food industry sector, in the form of an assembly of plates, rendered fluid-tight by flexible seals, which allows easy dismantling and rapid cleaning. This property in fact makes it possible to solve the problems of bacterial contamination which is very much present in the food industry.

Whether in the form of plates and seals, or in the form of welded plates, they are lighter than tube and trough exchangers and are particularly compact. This compactness generally derives from the small space between two consecutive plates, which results in a hydraulic diameter which is also very small. In fact it is known that, for equal performance, the length of an exchanger is proportional to its hydraulic diameter: that smaller the latter is, the shorter the exchanger will be.

For mainly mechanical reasons, the plates most often have undulations in a zig-zag pattern ("herring bones") consisting of straight sections a few centimetres long, followed by a change of direction, as shown in G-A-798 535.

This profile has a particularly good performance when the flow speeds are low and the viscosity of the fluids is relatively high (the case of liquids).

On the other hand, this profile is less well adapted thermally in the case of gasses.

The ideal would be to be able to produce an exchanger simultaneously combining the properties of compactness and lightness of plate exchangers with the good thermal and hydraulic performances of the internal tubular profile.

U.S. Pat. No. 4,029,146 proposes heat exchangers consisting of plates with straight longitudinal undulations assembled in pairs in order to form individual modules defining, inside of them, longitudinal ducts in which a first heat exchange fluid flows. These modules are grouped to form a bundle. The second fluid flows in the intervals formed by spacers between the modules. The path of the second fluid is not very appropriate, either from the point of view of heat exchanges or from that of head load.

JP-A-58 128 236 describes a welding and hydroforming method for manufacturing a heat module. For this purpose two metal sheets are welded to each other along longitudinal lines which are parallel with one another and by a peripheral weld bead interrupted at two opposite corners of the module for the inlet and outlet of the fluid. There is then introduced between the two sheets a fluid under pressure which deforms the structure by inflation between the weld beads in such a way as to define on the one hand longitudinal channels between the longitudinal beads and, on the other hand, end collectors along the transverse sides, at each end of the longitudinal channels. In order to control the inflation of the module during the hydroforming phase, the module is placed between two fixed surfaces which limit the expansion of the module in the direction of the thickness. Such a module raises production problems and operational efficiency problems. One of the observations which is the reason for the present invention is that hydroforming gives industrially acceptable results only if the shapes sought correspond to mutually compatible deformation modes from one region of the part to another. In particular, the part cannot inflate without its overall width diminishing. Now the transverse parts of the peripheral weld of JP-A-58 128 236 constitute a reinforcement which opposes such deformation, at least in the zones close to the ends of the longitudinal channels. Similarly, the transverse collectors assume, during hydroforming, a generally tubular profile which also behaves like a powerful transverse stiffener. Furthermore, the fluid inlets and outlets through the corners of the module result in an unequitable distribution of fluid in the various longitudinal ducts.

The production of longitudinal weld beads raises problems because the sheets tend to deform and detach from one another during the welding under the effect of thermal stresses. This is true even with the laser welding method, even though a lower energy density is used.

Certainly, FR-A-2 685 462 proposes limiting the welding of the module to points of contact distributed over the surface. But the structure thus obtained is inefficient from the hydrodynamic and thermal points of view. The method mentioned for arranging the ends of the bundle as a plate, by the formation of bent rims on each sheet, is complex. The bending of non-flat zones of the sheet raises production problems.

The purpose of the present invention is thus to propose an exchange bundle, a heat exchanger and production methods which make it possible to produce a heat exchanger which is optimized in terms of fluid exchanges and thermal exchanges without causing particular difficulties in its industrial production.

According to a first aspect of the invention, the heat exchange bundle comprising:

modules each comprising two sheets laser welded along longitudinal lines which between them define first passages, of substantially tubular shape, for a first exchange fluid;

positioning means, for positioning the modules with respect to each other in such a way as to define, between the modules, second passages for a second exchange fluid;

is characterized by distributer means for distributing, in a substantially equitable and/or symmetrical manner, the flow of at least one of the first and second fluids between all of the corresponding passages.

Advantageously, the distributer means comprise, at least at one of the ends of each module, a transition zone which defines for the first fluid a first transition passage having, across the width of the module, a dimension progressively narrowing from the undulated zone where the longitudinal laser weld lines are to an open end of the module.

This transition zone has a double function. In operation, it allows an equitable distribution of the first fluid in the longitudinal ducts of each module. During manufacture, it allows a transition between the zone of the longitudinal ducts, where the width of the modules is distinctly reduced in comparison with the initial width of the sheets at the location in question, and the end of the modules where the width of the latter can be very close to the initial width of the sheets at the location in question.

It is very advantageous to provide welded points of contact between the two sheets in the transition passage. These points make it possible to more efficiently control the deformation of the sheets during the forming and in particular to control the variation in their overall width at each point along the length of the transition zone and furthermore assists good distribution of the fluid between the longitudinal ducts.

The distributer means can also comprise, at least at one end of the modules:

an end plate, also being part of the positioning means, traversed by openings in each of which is fixed, in a fluid-tight manner, a terminal orifice of the respective one of the modules; and a connection box, attached to the plate in such a way that the inside of the box is connected to the first passages through the openings of the plate.

This plate does not give rise to any particular fitting difficulties. The terminal orifices of the modules give access to the previously discussed transition passages. In this case, the plate can have, in the direction of the width of the modules, a dimension which is less than that of the modules, which allows access to the second passages, intended for the second fluid, on both sides of the plate.

The distance between the adjacent longitudinal welding lines can be less than or substantially equal to 30 mm.

It has been found, according to the invention, that such a separation, astonishingly small, makes it possible to produce, in good conditions, by laser welding and hydroforming, a module whose distortions can be perfectly controlled during manufacturing and which in practice provides good mechanical strength even if the sheets are very thin and the pressure difference between the two fluids is relatively large. The module according to this aspect of the invention reconciles the demands for industrial reliability, mechanical strength and hydraulic and thermal performance, and therefore for lightness and compactness of the resultant heat exchanger.

According to another aspect of the invention, the method of joining two sheets together by a laser weld bead, in particular in order to manufacture a heat exchange module for a bundle, is characterized in that the weld is formed through a window of a pressing device which presses the two sheets in mutual contact during the formation of the weld.

For weld beads of greater length, once an elementary bead is completed, the pressure of the pressing device is released in order to free the sheets and allow them to slide with respect to the pressing device until they reach a position in which the location of a following elementary bead is positioned in the window. In order to produce several parallel longitudinal beads, a pressing device is used in the form of a comb comprising several long-shaped parallel windows, through which one elementary bead is formed for each longitudinal bead, and this is done for each position of the sheets between two displacements.

The method of manufacturing a heat exchange module in which two sheets are joined together by parallel longitudinal weld beads, and by a closing weld bead which is at least partial at each end, and then between the sheets there is introduced a liquid under pressure in order to separate the sheets from one another by hydroforming between the weld beads, is characterized in that the closing weld bead is formed at a distance from the end of the longitudinal weld beads in such a way as to cause the appearance of a transition passage between the end of the module and the longitudinal ducts which are formed between the longitudinal weld beads. The transition passage constitutes a zone in which the width of the module varies between a value which is relatively little reduced with respect to the initial width of the sheets at the end of the module, and a more reduced value in the zone of the longitudinal ducts.

In order to produce the module, the blank can then be cut across the transition passage, for example by a jet of water under pressure, in order to retain at least one transition passage in the finished module.

According to an important aspect of the invention, during the hydroforming, the two sheets are placed between surfaces which limit the expansion of the module in the direction of the thickness, these surfaces defining for the module a smaller thickness in the zone of the end of the module than in a main zone covering the major part of the length of the module. In this way there is formed, between the modules, in the vicinity of the end of the latter, spaces giving access to second passages of the bundle, for connecting the latter with the exterior of the exchanger.

According to another of its aspects, the invention relates to a heat exchanger incorporating a bundle according to the first aspect, in a cover whose internal volume connects with the second passages. It is preferable that, in service, the fluid bathing the internal volume of the cover and the second passages is that one of the two fluids which is at the lowest pressure. In fact, the modules obtained by hydroforming have a better resistance to internal pressure than to external pressure.

Other features and advantages of the invention will furthermore emerge from the following description, relating to non-limitative examples.

In the accompanying drawings:

FIG. 1 is a partial perspective view of a module according to the invention, during manufacture;

FIG. 2 is a plan view of the module with a central tear-away;

FIG. 3 is a diagrammatic view in perspective of a welding stage in the manufacture of a module;

FIG. 4 is a perspective view of pressing devices used during the welding;

FIG. 5 is a plan view of the welding stage;

FIG. 6 is a longitudinal cross-section illustrating the hydroforming stage;

FIG. 7 is a detail of the left hand section of FIG. 6, shown at a larger scale;

FIG. 8 is a partial perspective view showing the hydroforming stage;

FIG. 9 is a partial perspective view showing the assembly of modules to form a bundle;

FIG. 10 is a plan view of one end of a preferred embodiment of a module which can be used in the bundle shown in FIG. 9;

FIG. 11 is a perspective view of an end plate of the bundle shown in FIG. 9;

FIG. 12 is a partial longitudinal crosssectional view of a heat exchanger according to the invention; and FIG. 13 is a diagrammatic perspective view showing the suspension of the bundle on bars.

In the example shown in FIGS. 1 and 2, a heat exchange module is obtained by laser welding two metal sheets 1 and 2. As shown by two longitudinal dotted and dashed lines 52 in FIG. 2, the initial shape of the sheets is rectangular in a central zone 8 and then narrows like a trapezium in each of two end zones 9, which have lateral cutouts 53.

The width of the sheets 1 and 2 can for example range between 50 and 800 mm. The length of the sheets is limited only by the dimension of the means available for limiting the expansion in thickness during the hydroforming as will be stated later in this description. In practice, sheets of 10 m and longer are possible. The thickness of the sheets can range from 0.5 to 1 mm. It is therefore very thin for mechanical, economical and thermal reasons.

The welding comprises at least one peripheral bead 3 having a gap 4 forming an orifice in the middle of one of the longitudinal ends of the sheets. The laser welding is again carried out in longitudinal beads 6 which are parallel with the longitudinal edges 7 of the sheets 1 and 2 and which extend over the whole of the central zone 8 of the sheets, covering the major part of the length of the sheets with the exception of the two end zones 9, each of which is adjacent to one of the longitudinal ends of the sheets. Each end of the weld beads 6 is reinforced by a weld spot 11 which in practice consists of a circular or ovoid bead of small diameter. In the central zone, the peripheral bead 3, has longitudinal parallel segments 12 which are substantially of the same length as the longitudinal beads 6. In each end zone 9, the peripheral bead 3 defines a transition zone 13 whose dimension measured parallel with the width of the sheets 1 and 2 reduces progressively from the end of the longitudinal beads 6 to the gap 4. The transition zone 13 has, in the example shown, the shape of two successive trapeziums, one of them slightly convergent and adjacent to the longitudinal beads 6 and the other more strongly convergent and going up to the gap 4. In the transition zone 13, the two sheets are joined to one another by laser weld spots 14 produced in the form of circular or ovoid beads.

Each transition zone 13 is formed of a region without weld spots 71, adjacent to the gap 4, a region with close weld spots 72 adjacent to the ends 11 of the longitudinal weld beads 6 and a region 74 located between the preceding two zones with respect to the length of the sheets.

In the region with close spots 72, the spots follow a staggered arrangement to which the weld spots 11 formed at the ends of the longitudinal beads 6 also belong. Each bead 6 therefore has a length different from its neighbouring beads.

In the region 74, the weld spots are also arranged in a staggered pattern, but with more space between them. The dotted and dashed lines 76, 77, 78, which will be described in detail later in this description, respectively indicate the separation between the regions 71 and 74, the separation between the regions 74 and 72, and a line passing substantially through all of the ends 11 of the beads 6.

In order to obtain, during the hydroforming which will follow, ducts which are as close as possible to the tubular profile, between the longitudinal beads 6, the distance between two successive longitudinal beads 6 must be small. It is also important, in order to obtain a good compactness of the exchanger, that the diameter of the quasi-tubes thus formed is as small as possible, without which the financial advantage very quickly disappears. A distance of between 15 and 30 mm between the adjacent longitudinal weld beads 6 has proved advantageous, but this value is not limitative.

There will now be described, with reference to FIGS. 3 to 5, a welding method which makes it possible to avoid the warping of the sheets under the effect of the thermal welding stress, in such a way as to avoid, on the one hand, the mutual detachment of the sheets during the welding and, on the other hand, the obtaining of modules which have flatness defects.

In order to produce the longitudinal weld beads 6, two plate-shaped pressing devices 16, 17 are used (FIGS. 3 and 4), between which the two sheets 1 and 2, one superimposed on the other, can move. The pressing devices 16 and 17 are subjected to the selective action of transverse pressing devices 18, which are themselves actuated by a press. When the press is activated, the two pressing devices 16 and 17 strongly compress the sheets 1 and 2 against one another thus preventing any mutual separation between them. When the pressing devices 16 and 17 are released, other pressing devices 20, located at a distance from the pressing devices 16, 17 tighten over the two sheets 1 and 2 and then move in the direction of the arrow 97 in order to cause the sheets 1 and 2 to move forward over a predetermined distance between the plates 16 and 17. Then the "other" pressing devices 20 loosen and return to the position shown. The two plates 16 and 17 define between them a slot 19 whose width corresponds substantially to that of the sheets 1 and 2. When the sheets 1 and 2 move forwards between the pressing devices 16 and 17, the latter are automatically positioned in the lateral direction with respect to the sheets 1 and 2. The pressing devices 16 and 17 are on the other hand prevented from following the sheets 1 and 2 longitudinally by means of a stop 21 (FIG. 4) which is integral with the frame of the welding machine.

The pressing devices 16 and 17 have the configuration of a comb, that is to say they have, for each longitudinal weld bead 6 to be produced, a long-shaped window 22 or 24. There is therefore a series of parallel upper windows 22 and a series of corresponding parallel lower windows 24. For simplification purposes, only three windows 22 have been shown in FIG. 3 and seven in FIG. 5, but these windows can be more numerous. Each window 22 or 24 allows the corresponding sheet 1 or 2 to appear in the region where a portion of a respective weld bead 6 is to be produced.

Each time the sheets 1 and 2 stop, an elementary bead 23 is formed through each upper window 22, either by a single head running longitudinally along each upper window 22 one after the other, or by a multiple head capable of welding through several windows 22 at the same time. Once the elementary beads 23 have been produced through the windows 22, the sheets 1 and 2 are moved by a length corresponding to one elementary bead 23. The lower windows 24 serve to prevent the laser welding from simultaneously forming a weld between the sheets 1 and 2 and the lower pressing device 17.

In a way which is not shown, the peripheral bead 3 and the weld spots 11, 14 can be produced according to a similar procedure, using a pressing device provided with a window or windows formed and positioned in an appropriate manner. For example, for the transition zone, the windows can consist of orifices having the relative disposition corresponding to the one required for a group of weld spots.

The stage of hydroforming the module will now be described with reference to FIGS. 6 to 8. For this purpose, the blank, constituted by the two welded plates, is placed between two surfaces 26 and 27 having between them a well-defined separation which corresponds to the desired thickness of the module in the central zone 8. The surfaces 26 and 27 are of sufficient size to cover completely the central zone 8 of the blank. Surfaces 28 and 29 which are closer to one another define between them the smaller thickness desired for the end zones 9 of the blank. In the example shown, the surfaces 28 and 29 are defined by spacers 31 placed against the surfaces 26 and 27, which also extend over the end zones 9. In FIG. 8, the upper surface 26 has been omitted for the purpose of clarity. A liquid, for example water, is then injected under pressure, for example at a pressure of 4 to 17 MPa, through at least one of the gaps 4 in the weld bead 3, it being possible for the other end to be obturated or to be used as another injection point for the liquid. The liquid causes the inflation of the blank by separating the two sheets with respect to each other between the weld beads and between the weld spots. The blank then assumes a first relatively large thickness e1 in the central zone 8, a second smaller thickness e2 in the regions 71 and 74 of the end zones 9 and a third even smaller thickness e3 in the region 72. The thickness e1 substantially corresponds to the separation between the faces 26 and 27. The thickness e2 substantially corresponds to the separation between the faces 28 and 29 of the spacers 31. The thickness e3 results from the large number of weld spots in the region 72 or, if necessary, from a boss provided over a portion of the spacers 31.

As shown in FIG. 1, the hydroforming causes the appearance of longitudinal ducts 32 between the longitudinal weld beads 6 and, as illustrated by a tear away, a transition passage 33 in the transition zone 13. The passage 33 connects the longitudinal ducts 32 with the opening 4. The two sheets form, on either side of the transition zone 13, lugs 34 in which notches or indentations 36 are formed by cutting out as represented in dotted line in FIG. 1. In FIG. 9, certain of the lugs 34 have been omitted in order to simplify the drawing. The indentations of the lugs which are in the upper position must be used for the suspension of the modules in the exchanger as will be stated later.

The assembly of modules to form a bundle will now be described with reference to FIGS. 9 to 11. The procedure starts by cutting off and discarding an end strip 38 at each end of the blank by cutting along a cutting line 39 (FIGS. 1 and 2) traversing the region 71 of the transition zone 13 not far from the gap 4. In this way there is formed, in place of the gap 4, a terminal orifice 40 of the module, which connects with the longitudinal ducts 32 by the intermediary of the transition passage 33.

FIG. 2 shows that each region with close spots 72 has the shape of an arc of circle about the center 45 of the terminal orifice 40 (the reference 40 is not shown in FIG. 2), and extends up to each lateral edge of the transition zone 13. The line 78 passing through the ends 11 of the longitudinal weld beads 6 also has the shape of an arc of circle about the center 45. However, this arc of circle has ends 79 curved away from the terminal orifice 40. This has proved favorable for preventing difficulty in feeding the longitudinal ducts 32a adjacent to the two longitudinal edges of the module. Because of the arc of circle arrangements of the region 72 and of the line 78, the first fluid encounters, in service, approximately the same resistance to flow or head loss in its path between the terminal orifice and each longitudinal duct 32, because the distance is the same as is the number of weld spots encountered. The speed of flow is approximately the same all along the path because the cross-section of the region 74 is approximately the same as the cross-section of the region 72, which is thinner but wider.

Once the strips 38 have been eliminated by cutting at 39, preferably carried out using a pressurized water jet, the terminal orifices 40 are fitted into openings of corresponding shape 41 of an end plate 42 (FIGS. 9 and 11) which is common to all of the modules of the bundle to be produced and which has, parallel with the width of the modules, a dimension 43 less than the width of the modules. The terminal orifices 40 are welded, as illustrated in FIG. 9, in the openings 41, in such a way as to attach the modules in a position in which they are in contact or quasi-contact with one another by means of the external crests of the undulations of the central zone 8, which is now undulated by the formation of the channels 32. Thus, a first exchange fluid, represented by the arrow 44 in FIG. 9, can penetrate into the internal passages of each module through the open ends 40 of the modules, through the openings 41 of the plate 42. A second exchange fluid can penetrate into the second channels, which are also of generally tubular shape and substantially axial, which are formed between the troughs of the undulations of adjacent modules and between the lines of contact or quasi-contact 98 (FIG. 9). For this purpose the second fluid passes on each side of the plate 42, due to the reduced dimension 43 of the latter, and between the regions with close spots 72 of the transition zones 13 of adjacent modules, due to their reduced thickness, as symbolized in the emerging direction by the arrows 46. It can be seen that the arrows 46 are substantially axial. The regions 72 therefore form between them second transition passages which emerge laterally on each side of the bundle and connect with the second channels.

FIGS. 12 and 13 illustrate an exchanger according to the invention comprising a cover 59 whose rectangular profile corresponds to that of the bundle and which tightly surrounds the bundle over its entire length. The bundle is suspended with the channels 32 oriented vertically. At the top of the cover 59 are attached, by welding, two opposite bars 61 (see also FIG. 13) which protrude towards the inside of the cover and are engaged in the indentations 36 of the lugs 34 of the modules in order to support the modules, and consequently the bundle, by suspension resulting from the support of the shoulders 62 forming the upper ends of the indentations 36 against the upper face of the bars 61. A connecting box 68, connected to a connecting pipe 69 for the first fluid, is welded in a fluid-tight manner, by its open periphery, to the periphery of the plate 42 in order to connect the terminal orifices of the modules with the connecting pipe 69.

The connecting box 68 has the general shape of a half-cylinder with respect to which the plate 42 extends substantially along an axial plane. A second connecting box 91 of half-cylindrical shape and substantially coaxial with the box 68 but with a larger diameter is attached to the upper edge of the cover 59 and to the upper face of the bars 61 in order to close the end of the cover 59. However, a connecting pipe 92 connects the connecting box 91 with the exterior of the exchanger for the flow of the second fluid as indicated by the arrows 93.

The connecting pipe 69 traverses the wall of the connecting box 91 in a fluid-tight manner.

The lower end of the exchanger can have a structure similar to that which has just been described except that it is not necessary to have bars 61.

The assembly shown in FIG. 14 can constitute an exchanger, or it can be housed in an enclosure which is resistant to pressure. The enclosure comprises pipes for the circulation of the fluids, which are connected to the connecting pipes 69, 92 for example by expansion bellows. It is therefore preferred, according to the invention, that the interior of the enclosure should be connected with the path of that one of the two fluids which is at the lowest pressure and that this fluid should be the one passing between the modules. In this case, the lower external connecting box can be eliminated in order to establish the connection between the downstream low pressure circuit and the interior of the enclosure.

In the region 74 (FIG. 2) of the transition zone, an annular strengthening weld 94 aligned with each end of the future terminal orifice 40 of the module can be seen. The welds 94 strengthen each module against the concentration of tensile stress which can be expected in this zone due to the excess pressure which tends to tear the modules away from the end plate 42. FIG. 1 shows that there has been reserved, between each strengthening weld 94 and the edge of the transition zone, a drainage duct 96 for preventing any retention of liquid in this zone if the exchanger has to be emptied for an operation such as cleaning, maintenance, etc.

What is claimed is:

1. A heat-exchange bundle comprising:
   modules each comprising two sheets laser welded along longitudinal lines which between them define first passages of substantially tubular shape, for a first exchange fluid;
   positioning means for positioning the modules with respect to each other in such a way as to define, between the modules, second passages for a second exchange fluid;
   distributer means for distributing, in a substantially equitable and/or symmetrical manner, the flow of at least one of the first and second fluids between all of the corresponding passages, said distributer means comprising at least one of the ends of each module a transition zone which defines for the first fluid a first transition passage; and
   wherein the modules are less thick in at least a section of the transition zone than in the undulating zone defining the first tubular passages, in such a way as to define, for the second fluid, between the transition zones of the adjacent modules, second transition passages emerging on each side of the bundle.

2. The bundle according to claim 1, characterized in that the modules are positioned in such a way that external crests of the undulations of adjacent modules are substantially in mutual contact.

3. The exchange bundle according to claim 1, characterized in that the first transition passage is arranged such that the head loss is substantially the same between a terminal orifice of the module and each substantially tubular first passage.

4. The heat exchange bundle according to claim 1, characterized in that the transition zone of each module is defined by a pocket between the two sheets of the module, and in that the pocket connects with the first substantially tubular passages.

5. The exchange bundle according to claim 1, characterized in that the first transition passage has, across the width of the module, a dimension which decreases progressively from the undulated zone where the longitudinal lines of laser welding are located to the terminal orifice of the module.

6. The exchange bundle according to claim 4, characterized by weld spots provided between the two sheets in the transition zone.

7. The exchange bundle according to claim 6, characterized in that the weld spots are distributed in a region with widely spaced weld spots in the vicinity of the terminal orifice and a region of close weld spots between the region of widely spaced weld spots and the first passages.

8. The exchange bundle according to claim 7, characterized in that the region of close weld spots has a generally arched shape about the center of the terminal orifice, and the ends of the weld beads defining the substantially tubular passages are distributed along a line arched about the center of the terminal orifice.

9. The heat exchange bundle according to claim 7, characterized in that the thickness of the module is less in the region of close spots than in the zone of the substantially tubular passages, in such a way as to define, for the second fluid, second transition passages between the regions of close weld spots of the adjacent modules.

10. The heat exchange bundle according to claim 6, characterized in that the weld spots are distributed according to a staggered arrangement which the ends of the longitudinal weld lines are part of.

11. The heat exchange bundle according to claim 1, characterized in that the ends of the longitudinal weld lines are part of a staggered arrangement.

12. The heat exchange bundle according to claim 1, characterized in that the transition zone is delimited on the side remote from the terminal orifice by the ends of the longitudinal weld lines arranged in an arched line about the center of the terminal orifice.

13. The heat exchange bundle according to claim 12, characterized in that the arched line has ends curved in the direction away from the terminal orifice.

14. The heat exchange bundle according to claim 1, characterized in that the distributer means comprise, at least at one of the ends of the modules:
   an end plate, also being part of the positioning means, traversed by openings in each of which is fixed, in a fluid-tight manner, a terminal orifice of the respective one of the modules;
   a connection box, attached to the plate in such a way that the inside of the box is connected to the first passages through the openings of the plate.

15. The bundle according to claim 14, characterized in that the two sheets of each module are connected together by strengthening welds substantially aligned with the longitudinal ends of the terminal orifice of the module.

16. The heat exchange bundle according to claim 15, characterized in that a drainage channel is formed between each strengthening weld and an edge of the internal space of the module.

17. The bundle according to claim 14, characterized in that the end plate has, parallel with the width of the modules, a dimension which is smaller than the width of the modules, in order to leave clear, on each side of the plate, a path for the access of the second fluid to the second passages.

18. The exchange bundle according to claim 1, characterized in that at least at one of the ends of each module the sheets form suspension lugs for the modules on each side of the transition passage.

19. The heat exchange bundle according to claim 18, characterized in that the lugs form a shoulder intended to rest on a support bar for the suspension of the module with the longitudinal ducts oriented vertically.

20. The heat exchange bundle according to claim 1, characterized in that the distance between the adjacent longitudinal lines is less than or substantially equal to 30 mm.

21. A heat exchanger comprising:
 a bundle according to claim 1, in a cover whose internal volume connects with the second passages.

22. The exchanger according to claim 21, characterized in that the fluid bathing the internal volume and the second passages is that one of the two fluids which is at the lowest pressure.

23. The exchanger according to claim 21, characterized in that the longitudinal ducts are oriented vertically and the cover is integral with supports protruding towards the interior in order to engage under shoulders (62) defined on lateral lugs of the modules of the bundle.

24. A heat-exchange bundle comprising:
 modules each comprising two sheets laser welded along longitudinal lines which between them define first passages of substantially tubular shape, for a first exchange fluid;
 positioning means for positioning the modules with respect to each other in such a way as to define, between the modules, second passages for a second exchange fluid;
 distributer means for distributing, in a substantially equitable and/or symmetrical manner, the flow of at least one of the first and second fluids between all of the corresponding passages, said distributer means comprising at least at one of the ends of each module a transition zone which defines for the first fluid a first transition passage; and
 wherein the transition zone comprises a terminal region adjacent to the terminal orifice and an intermediate region disposed between the terminal region and the undulated zone, and wherein said intermediate region is less thick than said terminal region and than the undulated zone, in such a way as to define, between the intermediate regions of the adjacent modules, second transition passages for the second fluid.

25. The bundle according to claim 24, characterized in that the modules are positioned in such a way that the external crests of the undulations of adjacent modules are substantially in mutual contact.

26. The exchange bundle according to claim 24, characterized in that the first transition passage is arranged such that the head loss is substantially the same between a terminal orifice of the module and each substantially tubular first passage.

27. The heat exchange bundle according to claim 24, characterized in that the transition zone of each module is defined by a pocket between the two sheets of the module, and in that the pocket connects with the first substantially tubular passages.

28. The exchange bundle according to claim 24, characterized in that the first transition passage has, across the width of the module, a dimension which decreases progressively from the undulated zone where the longitudinal lines of laser welding are located to the terminal orifice of the module.

29. The exchange bundle according to claim 27, characterized by weld spots provided between the two sheets in the transition zone.

30. The exchange bundle according to claim 29, characterized in that the weld spots are distributed in a region with widely spaced weld spots in the vicinity of the terminal orifice and a region of close weld spots between the region of widely spaced weld spots and the first passages.

31. The heat exchange bundle according to claim 24, characterized in that the distributer means comprise, at least at one of the ends of the modules:
 an end plate, also being part of the positioning means, traversed by openings in each of which is fixed, in a fluid-tight manner, a terminal orifice of the respective one of the modules; and
 a connection box, attached to the plate in such a way that the inside of the box is connected to the first passages through the openings of the plate.

32. A heat-exchange bundle comprising:
 modules each comprising two sheets laser welded along longitudinal lines which between them define first passages of substantially tubular shape, for a first exchange fluid;
 positioning means for positioning the modules with respect to each other in such a way as to define, between the modules, second passages for a second exchange fluid;
 distributer means for distributing, in a substantially equitable and/or symmetrical manner, the flow of at least one of the first and second fluids between all of the corresponding passages, said distributer means comprising at least one of the ends of each module a transition zone which defines for the first fluid a first transition passage;
 wherein the transition zone of each module is defined by a pocket between the two sheets of the module, said pocket communicating with the first substantially tubular passage; and
 wherein there is provided between the two sheets in the transition zone a plurality of weld spots distributed in a first region with widely spaced weld spots in the vicinity of the terminal orifice and a second region of close weld spots between said first region and the first passages.

33. The exchange bundle according to claim 32, characterized in that the modules are less thick in at least a section of the transition zone than in the undulating zone defining the first tubular passages, in such a way as to define, for the second fluid, between the transition zones of the adjacent modules, second transition passages emerging on each side of the bundle.

34. The heat exchange bundle according to claim 32, characterized in that the transition zone comprises a terminal region adjacent to the terminal orifice and an intermediate region disposed between the terminal region and the undulating zone, and in that this intermediate region is less thick than the said terminal region and than the undulating zone, in such a way as to define, between the intermediate regions of the adjacent modules, second transition passages for the second fluid.

35. The exchange bundle according to claim 32, wherein said second region having close weld spots has a generally arched shape about the center of the terminal orifice, and the ends of the weld beads defining the substantially tubular passages are distributed along a line arched about the center of the terminal orifice.

36. The beat-exchange bundle according to claim 32, wherein the thickness of the module is less in said second region having close spots than in the zone of the substantially tubular passages thereby to define for the second fluid second transition, passages, between said second regions of the adjacent modules.

37. A heat-exchange bundle comprising:

modules each comprising two sheets laser welded along longitudinal lines which between them define first passages of substantially tubular shape, for a first exchange fluid;

positioning means for positioning the modules with respect to each other in such a way as to define, between the modules, second passages for a second exchange fluid;

distributer means for distributing, in a substantially equitable and/or symmetrical manner, the flow of at least one of the first and second fluids between all of the corresponding passages, said distributer means comprising at least at one of the ends of each module a transition zone which defines for the first fluid a first transition passage;

wherein the transition zone of each module is defined by a pocket between the two sheets of the module, said pocket communicating with the first substantially tubular passages; and wherein there is provided between said two sheets in the transition zone a plurality of weld spots distributed according to a staggered arrangement which the ends of the longitudinal weld lines are part of.

38. A heat-exchange bundle comprising:

modules each comprising two sheets laser welded along longitudinal lines which between them define first passages of substantially tubular shape, for a first exchange fluid;

positioning means for positioning the modules with respect to each other in such a way as to define, between the modules, second passages for a second exchange fluid;

distributer means for distributing, in a substantially equitable and/or symmetrical manner, the flow of at least one of the first and second fluids between all of the corresponding passages, said distributer means comprising at least at one of the ends of each module a transition zone which defines for the first fluid a first transition passage; and wherein the ends of the longitudinal weld lines are part of a staggered arrangement.

39. A heat-exchange bundle comprising:

modules each comprising two sheets laser welded along longitudinal lines which between them define first passages of substantially tubular shape, for a first exchange fluid;

positioning means for positioning the modules with respect to each other in such a way as to define, between the modules, second passages for a second exchange fluid;

distributer means for distributing, in a substantially equitable and/or symmetrical manner, the flow of at least one of the first and second fluids between all of the corresponding passages, said distributer means comprising at least at one of the ends of each module a transition zone which defines for the first fluid a first transition passage;

wherein the transition zone is delimited on the side remote from the terminal orifice by the ends of the longitudinal weld lines arranged in an arched line about the center of the terminal orifice; and said arched line having ends curved in the direction away from the terminal orifice.

40. A heat-exchange bundle comprising:

modules each comprising two sheets laser welded along longitudinal lines which between them define first passages of substantially tubular shape, for a first exchange fluid;

positioning means for positioning the modules with respect to each other in such a way as to define, between the modules, second passages for a second exchange fluid;

distributer means for distributing, in a substantially equitable and/or symmetrical manner, the flow of at least one of the first and second fluids between all of the corresponding passages, said distributer means comprising at least at one of the ends of each module a transition zone which defines for the first fluid a first transition passage;

wherein the distributer means comprise, at least at one of the ends of the modules:

an end plate also being part of the positioning means, traversed by openings in each of which is fixed, in a fluid-tight manner, a terminal orifice of the respective one of the modules;

a connection box attached to the plate in such a way that the inside of the box is connected to the first passages through the openings of the plate; and wherein the two sheets of each module are connected together by strengthening welds substantially aligned with the longitudinal ends of the terminal orifice of the module, a drainage channel being formed between each strengthening weld and an edge of the internal space of the module.

41. A method of manufacturing a heat exchange module of a heat exchange bundle comprising:

a plurality of said modules each comprising two sheets laser welded along longitudinal lines which between them define first passages of substantially tubular shape, for a first exchange fluid, each said sheet defining for a said module an external face with rounded undulations in correspondence with said first passages;

positioning means for positioning the modules with respect to each other in such a way as to define, between the modules, second passages for a second exchange fluid; and distributer means for distributing, in a substantially equitable and/or symmetrical manner, the flow of at least one of the first and second fluids between all of the corresponding passages, in which method two sheets are joined together by parallel longitudinal weld beads and by a closing weld bead which is at least partial at each end, and then between the sheets there is introduced a liquid under pressure in order to separate the sheets from one another, by hydroforming, between the weld beads, wherein the closing weld bead is formed at a distance from the end of the longitudinal weld beads in such a way as to cause the appearance of a transition passage between the end of the module and the longitudinal ducts which are formed between the longitudinal weld beads, and wherein during the hydroforming, the two sheets are placed between surfaces which limit the expansion of the module in the direction of the thickness, these surfaces defining for the module a smaller thickness in a zone of the end of the module than in a central zone covering the major part of the length of the module.

42. The method according to claim 41, wherein in order to define said smaller thickness, a spacer is placed against at least one of the surfaces defining between them the maximum thickness permitted for the central zone.

43. The method according to claim 41, characterized in that the transition passage is given a shape which narrows, in the direction of the width of the sheets, from the longitudinal weld beads towards the end of the module.

44. The method according to claim 41, characterized in that the two sheets are welded to one another at spots in the transition passage.

45. The method according to claim 44, characterized in that, after the hydroforming, the end of the bundle is cut along a line separated from the weld spots in such a way as to define a terminal orifice of the module.

46. The method according to claim 41, characterized in that, after the hydroforming, the end of the bundle is cut in such a way as to define a terminal orifice (40) of the module at a distance from the end of the longitudinal weld beads.

47. The method according to claim 41, characterized in that, in order to define the said smaller thickness, a spacer is placed against at least one of the surfaces defining between them the maximum thickness permitted for the central zone.

48. The heat exchange bundle according to claim 40, characterized in that the distributer means comprise at least one of the ends of each module a transition zone which defines for the first fluid a first transition passage.

49. The exchange bundle according to claim 48, characterized in that the modules are less thick in at least a section of the transition zone than in the undulating zone defining the first tubular passages, in such a way as to define, for the second fluid, between the transition zones of the adjacent modules, second transition passages emerging on each side of the bundle.

50. The heat exchange bundle according to claim 30, characterized in that the transition zone comprises a terminal region adjacent to the terminal orifice and an intermediate region disposed between the terminal region and the undulated zone, and in that this intermediate region is less thick than the said terminal region and than the undulated zone, in such a way as to define, between the intermediate regions of the adjacent modules, second transition passages for the second fluid.

* * * * *

UNITED STATES PATENT AND TRADEMARK OFFICE
CERTIFICATE OF CORRECTION

PATENT NO. : 6,289,977 B1
DATED : September 18, 2001
INVENTOR(S) : Claudel et al.

It is certified that error appears in the above-identified patent and that said Letters Patent is hereby corrected as shown below:

<u>Column 7,</u>
Line 37, delete "e1" with the bond font and insert -- e1 -- in the normal font.

<u>Column 13,</u>
Line 1, delete "beat exchange" and insert -- heat exchange --.

<u>Column 16,</u>
Line 15, delete "claim 30" and insert -- claim 38 --.

Signed and Sealed this

Twenty-fourth Day of September, 2002

*Attest:*

*Attesting Officer*

JAMES E. ROGAN
*Director of the United States Patent and Trademark Office*